May 28, 1968

M. GRASER, JR 3,385,924

PROJECTION SYSTEM

Filed Nov. 4, 1964

INVENTOR:
MICHAEL GRASER, JR.

BY *Julius J. Goslabsky*
HIS ATTORNEY.

INVENTOR:
MICHAEL GRASER, JR.

INVENTOR:
MICHAEL GRASER, JR.

BY *Julius J. Zaskalicky*
HIS ATTORNEY.

United States Patent Office 3,385,924
Patented May 28, 1968

3,385,924
PROJECTION SYSTEM
Michael Graser, Jr., Fayetteville, N.Y., assignor to General
Electric Company, a corporation of New York
Filed Nov. 4, 1964, Ser. No. 408,867
3 Claims. (Cl. 178—5.4)

The present invention relates to systems for the projection of images of the kind including a light modulating medium in which diffraction gratings are formed by electron charge deposited thereon in accordance with electrical signals corresponding to the images.

In particular, the invention relates to improvements in systems such as disclosed and claimed in copending application Ser. No. 384,955, filed July 24, 1964, and assigned to the assignee of the present invention for the projection of color images using a common area of the light modulating medium and a common electron beam to produce a plurality of such diffraction gratings in the medium, in response to a plurality of simultaneously occurring electrical signals each corresponding to a respective primary color component. Such diffraction gratings simultaneously control the transmission through the medium point by point of the primary color components, in kind and intensity, in a beam of light.

Such systems are provided with a pair of light masks, in particular with a light output mask having a plurality of slots therein to mask the beam of light in the absence of any diffraction grating being formed in the light modulating medium and to pass light in the presence of gratings in the medium. The intensity of the portions of the beam of light deviated by the light modulating medium and passed through the apertures of the light mask varies in relation to the amplitude of the grating produced in the light modulating medium. The light output mask comprises a first and second set of opaque bars and transparent slots, the bars and slots of one set being vertically disposed in a vertically extending central section of the light output mask, the bars and slots of the other set being horizontally disposed in a pair of segments of the light mask on opposite sides of the central section. Vertically oriented diffraction gratings associated with the red and blue primary color channels cooperate with the vertically oriented slots and horizontally oriented diffraction grating associated with the green primary color channel cooperates with the horizontally oriented slots. The red and blue or magenta light is imaged through the light modulating medium onto the central section of the light output mask and the green light is imaged through the common area of the light modulating medium onto the side segments of the light output mask. Thus green light is subject to deviation by the red diffraction grating. As the green output slots and bars are horizontally disposed normally such deviation would produce no visible light output in the green channel. However, the green light which is incident on the light modulating medium and is imaged on portions of the side segments adjacent the central section is deviated by the red diffraction grating into the vertical slots immediately adjacent thereto. Such deviation may be sufficient to contaminate the red light emerging from such slots giving the light an undesired orangish hue. The present invention is directed to eliminating such cross contamination without appreciably affecting the overall light efficiency of the red channel.

The novel features believed characteristic of the invention are set forth in the appended claims. The invention itself, together with further objects and advantages thereof may best be understood by reference to the following description taken in connection with the accompanying drawings in which:

FIGURE 1 is a schematic diagram of the optical and electrical elements of a system useful in explaining the present invention.

Figure 2A:
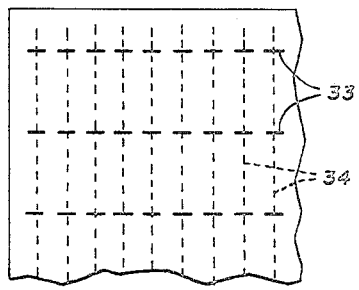
FIGURES 2A through 2F are diagrammatic representations of the active area of the light modulating medium showing the horizontal scan lines and the location of charge with respect thereto for the various primary color channels of the system.

Referring now to FIGURE 1 there is shown a simultaneous color projection system comprising an optical channel including a light modulating medium 10, and an electrical channel including an electron beam device 11, the electron beam 12 of which is coupled to the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity of each of the three primary color constituents of an image to be projected are applied to the electron beam device 11 to modulate the beam thereof in the manner to be more fully described below, to produce deformations in the light modulating medium which modify the light transmitted by the modulating medium in point by point correspondence with the image to be projected. An apertured light mask and projection lens system 14, which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in a horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. With the arrangement described efficient utilization is made of light from the source, and also uniform distribution of light is produced on the light modulating medium. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, an output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 31, and is projected by the projection lens system 32 onto the screen 15. The details of the light input optics of the light valve projection system shown in FIGURE 1 are described in the aforementioned copending patent application Ser. No. 316,606, filed Oct. 16, 1963, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Ser. No. 336,505, filed Jan. 8, 1964, and assigned to the assignee of the present invention.

According to present day color television standards in force in the United States an image to be projected by a television system is scanned by a light-to-electrical converter horizontally once every $\frac{1}{15735}$ of a second, and vertically at a rate of one field of alternate lines every one-sixtieth of a second. Correspondingly, an electron beam of a light producing or controlling device is caused to move at a horizontal scan frequency of 15,735 cycles per second in synchronism with the scanning of the light converter, and to form thereby images of light varying in intensity in accordance with the brightness of the image to be projected. The pattern of scanning lines, as well as the area of scan, is commonly referred to as the raster.

Figure 2B:
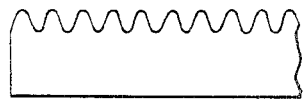

In FIGURE 2A is shown in schematic form a portion of such a raster in the light modulating medium along with the diffraction grating corresponding to the red color component. The size of the raster or whole area scanned in the embodiment is approximately 0.82 of an inch in height, and 1.10 of an inch in width. The horizontal dash lines 33 are the alternate scanning lines of the raster appearing in one of the two fields of a frame. The spaced vertically oriented dotted lines 34 on each of the raster lines, i.e., extending across the raster lines schematically represent concentrations of charge laid down by an electron beam to form the red diffraction grating in a manner to be described hereinafter, such concentrations occurring at equally spaced intervals on each line, corresponding parts of each scanning line having similar concentrations thereby forming a series of lines of charge equally spaced from adjacent lines which cause the formation of valleys in the light modulating medium, the depth of such valleys, of course, depending upon the concentration of charge. Such a wave is produced by a signal superimposed on an electron beam moving horizontally at a frequency 15,735 cycles per second, a carrier wave, of smaller amplitude but of fixed frequency of the order of 16 megacycles per second thereby producing a line-to-line spacing in the grating of approximately $\frac{1}{760}$ of an inch. The high frequency carrier wave causes a velocity modulation of the beam thereby causing the beam to move in steps, and hence to lay down the pattern of charge schematically depicted in this figure with each valley extending in the vertical direction and adjacent valleys being spaced apart by a distance determined by the carrier frequency as shown in greater detail in FIGURE 2B which is a side view of FIGURE 2A.

Figure 2C:
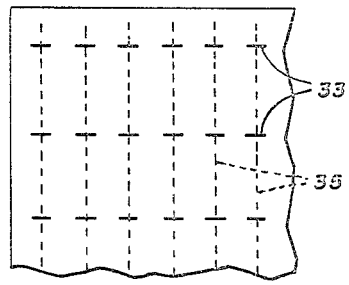
Figure 2D:
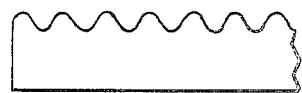

In FIGURE 2C is shown a section of the raster on which a blue diffraction grating has been formed. As in the case of the red diffraction grating, the vertically oriented dotted lines 35 of each of the electron beam scan lines 33 represent concentrations of charge laid down by the electron beam. The grating line to line spacing is uniform, and the amplitude thereof varies in accordance with the amount of charge present. The blue grating is formed in a manner similar to the manner of formation of the red grating, i.e., a carrier frequency of amplitude smaller than the horizontal deflection wave is applied to produce a velocity modulating in the horizontal direction of the electron beam, at that frequency rate, thereby to lay down charges on each line that are uniformly spaced with the line to line spacing being a function of the frequency. A suitable frequency is nominally 12 megacycles per second. In FIGURE 2D is shown a side view of the section of the light modulating medium showing the deformations produced in the medium in response to the aforementioned lines of charge.

Figures 2E, 2F:
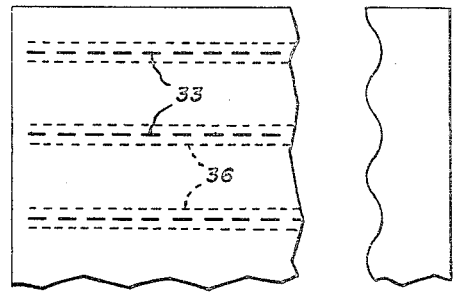

In FIGURE 2E is shown a section of the raster of the light modulating medium on which the green diffraction grating has been formed. In this figure are shown the alternate scanning lines 33 of a frame or adjacent lines of a field. On each side of the scanning lines are shown dotted lines 36 schematically representing concentrations of charge extending in the direction of the scanning lines to form a diffraction grating having lines or valleys extending in the horizontal direction. The green diffraction grating is controlled by modulating the electron scanning beam at very high frequency, nominally 48 megacycles in the vertical direction, i.e., perpendicular to the direction of the lines, to produce a uniform spreading out or smearing of charge transverse to the scanning direction of the beam, the amplitude of the smear in such direction varying proportionately with the amplitude of the high frequency carrier signal, which amplitude varies inversely with the amplitude of the green video signal. The frequency chosen is higher than either the red or blue carrier frequency to avoid the undesired interaction with signals of other frequencies of the system including the video signals and the red and blue carrier waves, as will be more fully explained below. With low modulation of the carrier wave more charge is concentrated in a line along the center of the scanning direction than with high modulation thereby producing a greater deformation in the light modulating medium at that part of the line. In short, the natural grating formed by the focussed beam represents maximum green modulation or light field, and the defocussing by the high frequency modulation deteriorates or smears such grating in accordance with the amplitude of such modulation. For good dark field the grating is virtually wiped out. FIGURE 2F is a sectional view of the light modulating medium of FIGURE 2E showing the manner in which the concentrations of charge along the adjacent lines of a field function to deform the light modulating medium into a series of valleys and peaks representing a phase diffraction grating.

Thus FIGURE 2 depicts the manner in which a single electron beam scanning the raster area in the horizontal direction at spaced vertical intervals may be simultaneously modulated in velocity in the horizontal direction by two amplitude modulated carrier waves, both substantially higher in frequency than the scanning frequency, one substantially higher than the other, to produce a pair of superimposed vertically extending phase diffraction gratings of fixed spacing thereon, and also may be modulated in the vertical direction by an amplitude modulated carrier wave to produce a third grating having lines of fixed line to line spacing extending in the horizontal direction orthogonal to the direction of grating lines of the other two gratings. By amplitude modulating the three beam modulating signals corresponding point by point variations in the depth of the valleys or lines of the diffraction grating are produced. Thus by applying the three signals indicated, each simultaneously varying in amplitude in accordance with the intensities of a respective primary color component of the image to be projected, three primary diffraction gratings are formed, the point by point amplitude of which vary with the intensity of a respective color component.

As used in this specification with reference to the specific raster area of the light modulating medium, a point represents an area of the order of several square mils and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in general a system such as the kind under consideration herein that one grating line is adequate to function for proper control of the luminance characteristic of a picture element in the projected image and that about three to four lines are a minimum for the proper control of hue and saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of a grating controls the deviation, and hence color component selection, and the amplitude of the grating controls the intensity of such component. By the selection of the spacing of the blue and red grating, in a red, blue, and green primary system, for example, such that the spacing of the blue grating is sufficiently smaller in magnitude than the red grating so as to produce the same deviation in first order light as the deviation of the red component by the red grating, the deviation of the red and blue components can be made the same. Thus the red and blue components can be passed through the same apertures in an output mask and the relative magnitude of the red and blue light would vary in accordance with the amplitude of the gratings. Such a system is described and claimed in U.S. Patent No. Re. 25,169, W. E. Glenn, Jr., assigned to the same assignee of the present invention.

When a pair of phase diffraction gratings such as those described are simultaneously formed and superimposed in a light modulating medium, inherently another diffraction grating, referred to as the beat frequency grating, is formed which has a spacing greater than either of the other two gratings, if the beat frequency itself is lower than the frequency of either of the other two gratings. The effect of such a grating, as is apparent from the considerations outlined above, is to deviate red and blue light incident thereon less than is deviated by the other two gratings and hence such light is blocked by the output mask having apertures set up on the basis of considerations outlined in the previous paragraph. Such blockage represents impairment of proper color rendition as well as loss of useful light. One way to avoid such effects in a two color component system is to provide diffraction gratings which have lines or valleys extending orthogonal to one another. Such an arrangement is disclosed and claimed in U.S. Patent 3,078,338, W. E. Glenn, Jr., assigned to the assignee of the present invention. However, when it is desired to provide three diffraction gratings superimposed on a light modulating medium for the purpose of modulating simultaneously point by point the relative intensity of each of three primary color components in a beam of light, inevitably two of the phase gratings must be formed in a manner to have lines or valleys, or components thereof, extending in the same direction. The manner in which such effects can be avoided are described and claimed in the aforementioned copending patent application, Ser. No. 343,990, filed Feb. 11, 1964 and assigned to the assignee of the present invention.

Referring again to FIGURE 1, an electron writing system is provided for producing the phase diffraction gratings in the light modulating medium, and comprises an evacuated enclosure 40 in which are included an electron beam device 11 having a cathode (not shown), a control electrode (not shown), and a first anode (not shown), a pair of vertical deflection plates 41, a pair of horizontal deflection plates 42, a set of vertical focus and deflection electrodes 43, a set of horizontal focus and deflection electrodes 44, and the light modulating medium 10. The cathode, control electrode, and first anode along with the transparent target electrode 43 supporting the light modulating medium 10 are energized from a source 46 to produce in the evacuated enclosure an electron beam that at the point of focussing on the light modulating medium is of small dimensions (of the order of a mil), and of low current (a few microamperes), and high voltage. Electrodes 41 and 42, connected to ground through respective high impedances 68a, 68b, 68c, and 68d provide a deflection and focus function, but are less sensitive to applied deflection voltages than electrodes 43 and 44. The electrodes 43 and 44 control both the focus and deflection of the electron beam in the light modulating medium in a manner to be more fully explained below.

A pair of carrier waves which produce the red and blue gratings, in addition to the horizontal deflection voltage are applied to the horizontal deflection plates 42. The electron beam, as previously mentioned, is deflected in steps separated by distances in the light modulating medium which are a function of the grating spacing of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 to spread the beam out in accordance with the amplitude of the green video signal as explained above. The light modulating medium 10 is an oil of appropriate viscosity and of deformation decay characteristics on a transparent support member 45 coated with a transparent conductive layer adjacent the oil such as indium oxide. The electrical conductivity and viscosity of the light modulating medium is so constituted so that the amplitude of the diffraction gratings decay to a small value after each field of scan thereby permitting alternate variations in amplitude of the diffraction grating at the sixty cycle per second field scanning rate. The viscosity and other properties of the light modulating medium are selected such that the deposited charges produce the desired deformations in the surface. The conductive layer is maintained at ground potential and constitutes the target electrode for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks the source of the horizontal deflection and beam modulating voltages which are applied to the horizontal deflection plates to produce the desired horizontal deflection. This portion of the system comprises a source of red video signal 50, and a source of blue video signal 51 each corresponding, respectively, to the intensity of the respective primary color component in a television image to be projected. The red video signal from the source 50 and a carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplifier 57 is applied to the horizontal plates 44. The output of the horizontal deflection sawtooth source 58 is also applied to plates 44 and plates 42 through capacitors 49a and 49b.

Below the evacuated enclosure 40 are shown in block form the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. A output wave is obtained from the modulator having a carrier frequency equal to the carrier frequency of the green grating frequency source and an amplitude varying inversely with the amplitude of the green video signal. The modulated carrier wave and the output from the vertical deflection source 63 are applied to a conventional push-pull amplifier 64, the output of which is applied to vertical plates 43 to produce deflection of the electron beam in the manner previously indicated. The output of the vertical deflection sawtooth source 63 is also applied to the plates 43 and to plates 41 through capacitors 49c and 49d.

A circuit for accomplishing the deflection and focusing functions described above in conjunction with the deflection and focusing electrode system comprising two sets of four electrodes such as shown in FIGURE 1 is shown and described in a copending patent application Ser. No. 335,117, filed Jan. 2, 1964, and assigned to the assignee of the present invention. An alternative electrode system and associated circuit for accomplishing the deflection and focusing function is described in the aforementioned copending patent application, Ser. No. 343,990.

As mentioned above the red and blue channels make use of the vertical slots and bars and the green channel makes use of the horizontal slots and bars. The width of the slots and bars, in one arrangement or array is one set of values and the width of the slots and bars in the other arrangement is another set of values. The raster area of the modulating medium may be rectangular in shape and has a ratio of height to width or aspect ratio of three to four in accordance with television standards in force in the United States. The center-to-center spacing of the slots in the horizontal array is made three-fourths the center-to-center spacing of the slots in the vertical array. Each of the lenticules in each of the lenticular plates are also so proportioned, i.e., with height to width ratio of three to four. The lenticules in each plate are stacked into horizontal rows and vertical columns. Each of the lenticules in one plate are of one focal length and each of the lenticules on the other plate are of another focal length. The filter element may be constituted to have three sections registering light of red and blue color components in the central portion of the input mask and green light in the side sector portions as will be apparent from considering FIGURE 3.

Figure 3:
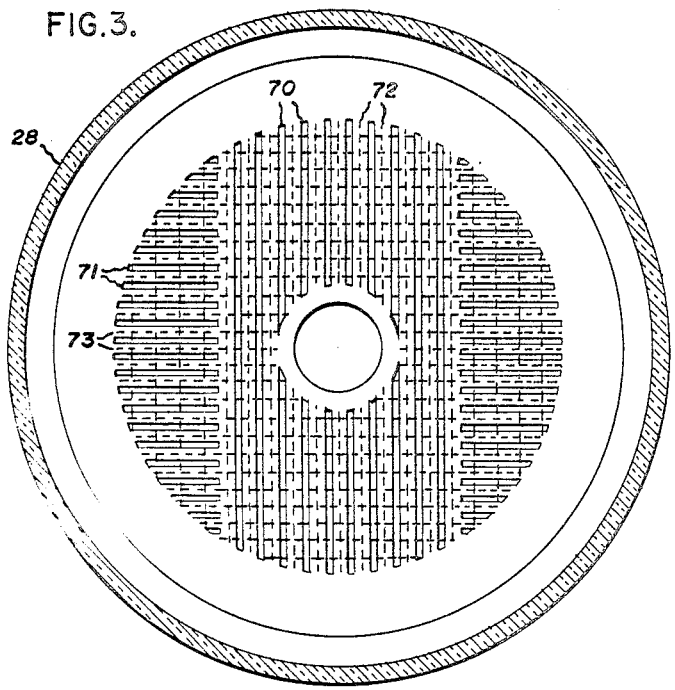
FIGURE 3 is an end view taken along sections 3—3 of the system of FIGURE 1 showing the second lenticular lens plate and the input mask thereof.

In FIGURE 3 is shown a view of the face of the second lenticular lens plate and input mask 28 as seen from the raster area of the modulating medium or along section 3—3 of FIGURE 1. In this figure the vertical oriented slots 70 are utilized in the controlling of the red and blue light color components in the image to be projected. The horizonally extending slots 71 located in the sector area in the input mask on each side of the central portion thereof function to cooperate with the light modulating medium and light output mask to control the green color component in the image to be projected. The ratio of the center-to-center spacing of the horizontal slots 71 to the center-to-center spacing of the vertical slots 70 is three-fourths. The rectangular areas enclosed by the vertical and horizontal dash lines 72 and 73 are the boundaries for the individual lenticules appearing on the opposite face of the plate 28. The focal length of each of the lenticules is the same. The center of each of the lenticules lies in the center of an element of a corresponding slot.

Figure 4:
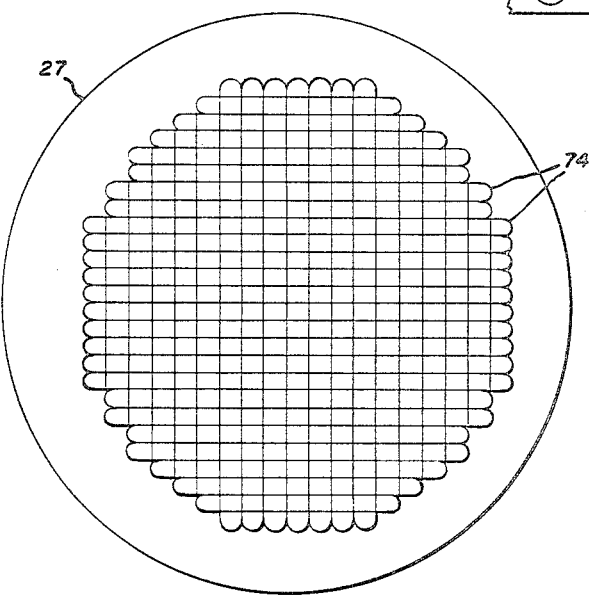
FIGURE 4 is an end view taken along section 4—4 of FIGURE 1 showing the first lenticular lens plate thereof.

FIGURE 4 shows the first lenticular lens plate 27 taken along section 4—4 of FIGURE 1 with horizontal rows and vertical columns of lenticules 74. Each of the lenticules of this plate cooperates with a correspondingly positioned lenticule on the second lenticular lens plate shown in FIGURE 3 in the manner described above. Each of the lenticules on plate 27 have the same focal length which is different from the focal length of the lenticules on the second lenticular plate 28.

Figure 5:
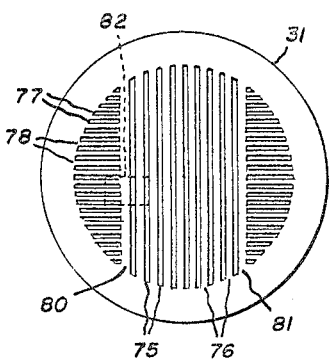
FIGURE 5 is an end view taken along section 5—5 of the system of FIGURE 1 showing the light output mask thereof.

FIGURE 5 shows the light output mask 31 of FIGURE 1 taken along section 5—5 thereof. This mask consists of a plurality of transparent slots 75 and opaque bars 76 in a central vertically extending section of the mask and a plurality of transparent slots 77 and opaque bars 78 in each of two sectors of the spherical mask lying on each side of the central portion thereof. As mentioned previously the slots and bars from the output mask are in a predetermined relationship to the slots and bars of the input mask.

The vertically extending bars 80 and 81 bordering on the horizontally extending slots are made substantially wider than the other vertical bars 76 in the vertically extending central section. For the system under consideration an increase of about 30% in the width in a direction toward the center has proved quite satisfactory. Such increase in the width of the bars decreases the width of the adjacent slots. Such decrease has substantially no appreciable effect on the transmission of red light through the slots as will be more fully explained below.

As mentioned above in a system such as described in FIGURE 1 in which a plurality of gratings are superimposed on a common area of the light modulating medium, and on which sources of primary color light, i.e., red, blue, and green light impinge, that with a mask system having the sections indicated in FIGURE 5 and the orientation of slots indicated in FIGURE 5, green light impinging on the red diffraction grating is deviated in the horizontal direction passing green light through the vertical slots associated with the red channel and contaminating the red light therein.

Figure 6:
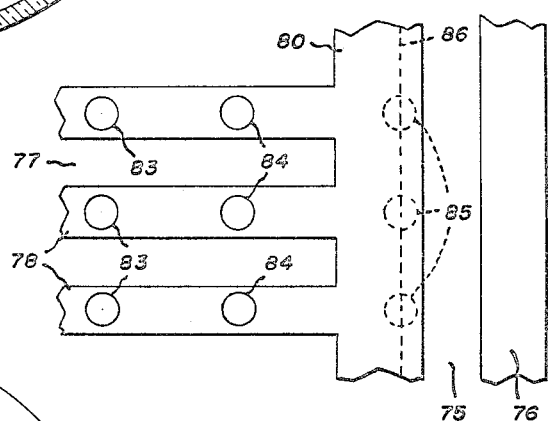
FIGURE 6 is an enlarged view of a section of the output mask of FIGURE 5 with light sources indicated thereon indicating the manner of operation of the invention.

The manner in which the enlargement of the vertical bars 80 and 81 function to avoid contamination of the red primary color channel by green light deviated by the red diffraction grating will be explained in connection with FIGURE 6 which shows an enlargement of the dotted rectangular section 82 of FIGURE 5. In this figure an enlarged bar 80 and an adjacent bar 76 is shown. Three horizontally extending bars 78 and two horizontally extending slots 77 defined thereby are shown. The circles 83 and 84 on the horizontal extending bars represent sources of green light such as those emerging from the lenticular plate system of FIGURE 1 imaged thereon. It will be appreciated for the explanation of the operation of the system of FIGURE 1 that the beams of light which form spots of such size on the bar pass through the raster area on which vertical red grating lines are formed. Such red grating lines deviate the beams of green light horizontally to the positions indicated by dotted circles 85 which represent the locus of first order green light from the sources 84 deviated by the red diffraction grating. Of course, spectral spread of first order light from source 84 is neglected for reasons of clarity. Such deviation is sufficient in the absence of the enlargement in bar 80 (and bar 81) included between the dotted line 86 and the right edge of the bar to cause green light to pass into the red channel and impart to the red light an orangish hue. With the enlargement indicated such green light is completely blocked and thus the impairment of the proper function of the red primary channel is avoided. The enlargement while avoiding the contamination of the red channel by green light does so without impairing the efficiency of transmission of the red channel. Such conclusion can be readily appreciated from a consideration of FIGURE 9A of the aforementioned patent application Ser. No. 365,751 in which is shown the relationship of the first and second orders of diffracted red light in relation to the zero order bar of a red source. First order red light falls beyond the remote edge of the first bar removed from the zero order bar, and second order red light falls in between the second and third bar removed from the zero order bar. As the edge of the enlarged bar is an adjacent edge with respect to any of the vertical bars with respect to which it is referenced, it is readily apparent that such enlargement would cause virtually no decrease in the transmission of the red color component.

While the invention has been described in specific embodiments, it will be appreciated that many modifications may be made by those skilled in the art, and we intend by the appended claims to cover all such modifications and changes as fall within the true spirit and scope of the invention.

What I claim as new and desire to secure by Letters Patent of the United States is:

1. In apparatus for projecting a color image corresponding to deformations contained in a light modulating medium in the form of three superimposed light diffraction gratings, a first grating having lines extending in one direction and second and third gratings having lines extending in another direction orthogonal to said one direction, the deformations of said first grating having an amplitude dependent upon the intensity of a first color component, the deformations of said second grating having an amplitude dependent upon the intensity of a second color component and the deformations of a third diffraction grating having an amplitude dependent upon the intensity of a third color component, the line to line spacing of said second diffraction grating being different from the line to line spacing of said third diffraction grating, the combination of:
- a source of light for producing said three color components of light,
- a first mask including a first and a second set of opaque bars and transparent slots, the bars and slots of one set extending in said one direction and the bars and slots of said other set extending in said other direction, said first light mask interposed between said source and said light modulating medium,
- said first set of opaque bars and transparent slots contained in one area of said mask and said second set of bars and slots contained in the remaining area of said mask,
- a second light mask including a first and second set of opaque bars and transparent slots, the bars and slots of each set extending respectively in said one and said other directions and disposed in the path of light coming from said light modulating medium,
- said first set of opaque bars and slots contained in one area of said second light mask and said second set of opaque bars and transparent slots contained in the remaining area of said second mask,
- said one area of said light masks and said remaining areas of said light masks being similar,
- said one area of said masks consists of two segments of substantially the same area and symmetrically located on said member with respect to the vertical axis thereof, and said other area consists of the central section between said segments vertically oriented with respect to said projected image, the slots in said one area of said masks being horizontally oriented and the slots of said other area of said masks being vertically oriented,
- the bars in said other area of said second mask located adjacent said segments of said one area being appreciably wider than the other bars of said other area, said increased width being in the inward direction of the mask,
- means for imaging light of said first color component from said source through said one area of said first mask and said light modulating medium on said one area of said second mask and for imaging light from said source of said second and third color components through said remaining areas of said first mask and said light modulating medium on said remaining area of said second mask.

2. In apparatus for projectiong a color image corresponding to deformations contained in a light modulating medium in the form of three superimposed light diffraction gratings, a first grating having lines extending in one direction and second and third gratings having lines extending in another direction orthogonal to said one direction, the deformations of said first grating having an amplitude dependent upon the intensity of a first color component, the deformations of said second grating having an amplitude dependent upon the intensity of a second color component and the deformations of a third diffraction grating having an amplitude dependent upon the intensity of a third color component, the line to line spacing of said second diffraction grating being different from the line to line spacing of said third diffraction grating, the combination of:
- a source of light for producing said three color components of light,
- a first mask including a first and a second set of opaque bars and transparent slots, the bars and slots of one set extending in said one direction and the bars and slots of said other set extending in said other direction, said first light mask interposed between said source and said light modulating medium,
- said first set of opaque bars and transparent slots contained in one area of said mask and said second set of bars and slots contained in the remaining area of said mask, a second light mask including a first and second set of opaque bars and transparent slots, the bars and slots of each set extending respectively in said one and said other directions and disposed in the path of light coming from said light modulating medium, said first set of opaque bars and slots contained in one area of said second light mask and said second set of opaque bars and transparent slots contained in the remaining area of said second mask, said light masks having a circular outline and said one area of said light masks and said remaining areas of said light masks being similar, said one area of said masks consists of two segments of substantially the same area and symmetrically located on said members with respect to the vertical axis thereof and said other area consists of the central section between said segments vertically oriented with respect to said projected image, the slots in said one area of said masks being horizontally oriented and the slots of said other area of said masks being vertically oriented, the bars in said other area of said second mask located adjacent said segments of said one area being 30% wider than the other bars of said other area, said increased width being in the inward direction of the mask, means for imaging light of said first color component from said source through said one area of said first mask and said light modulating medium on said one area of said second mask and for imaging light from said source of said second and third color components through said remaining areas of said first mask and said light modulating medium on said remaining area of said second mask.

3. In apparatus for projecting a color image corresponding to deformations contained in a light modulating medium in the form of three superimposed light diffraction gratings, a first grating having lines extending in one direction and second and third gratings having lines extending in another direction orthogonal to said one direction, the deformations of said first grating having an amplitude dependent upon the intensity of a green color component, the deformations of said second grating having an amplitude dependent upon the intensity of a red color component and the deformations of a blue diffraction grating having an amplitude dependent upon the intensity of a third color component, the line to line spacing of said second diffraction grating being different from the line to line spacing of said third diffraction grating, the combination of:

a source of light for producing said three color components of light, a first mask including a first and a second set of opaque bars and transparent slots, the bars and slots of one set extending in said one direction and the bars and slots of said other set extending in said other direction, said first light mask interposed between said source and said light modulating medium, said first set of opaque bars and transparent slots contained in one area of said mask and said second set of bars and slots contained in the remaining area of said mask, a second light mask including a first and second set of opaque bars and transparent slots, the bars and slots of each set extending respectively in said one and said other directions and disposed in the path of light coming from said light modulating medium, said first set of opaque bars and slots contained in one area of said second light mask and said second set of opaque bars and transparent slots contained in the remaining area of said second mask, said light masks having a circular outline and said one areas of said light masks and said remaining areas of said light masks being similar, said one area of said masks consists of two segments of substantially the same area and symmetrically located on said members with respect to the vertical axis thereof, and said other area consists of the central section between said segments vertically oriented with respect to said projected image, the slots in said one area of said masks being horizontally oriented and the slots of said other area of said masks being vertically oriented, the bars in said other area of said second mask located adjacent said segments of said one area being sufficiently wider than the other bars of said other area in the inward direction such that first order diffracted green light diffracted by the red diffraction grating from a source adjacent said bars is blocked from further passage through the system, means for imaging light of said green color component from said source through said one area of said first mask and said light modulating medium on said one area of said second mask and for imaging light from said source of said red and blue color components through said remaining areas of said first mask and said light modulating medium on said remaining area of said second mask.

No references cited.

JEWELL H. PEDERSEN, *Primary Examiner.*

W. L. SIKES, *Assistant Examiner.*